Feb. 7, 1961 W. G. GITTINS 2,970,410
APPARATUS FOR USE IN MANUFACTURING
PLASTIC FACED BUILDING UNITS
Filed Nov. 24, 1958 3 Sheets-Sheet 1
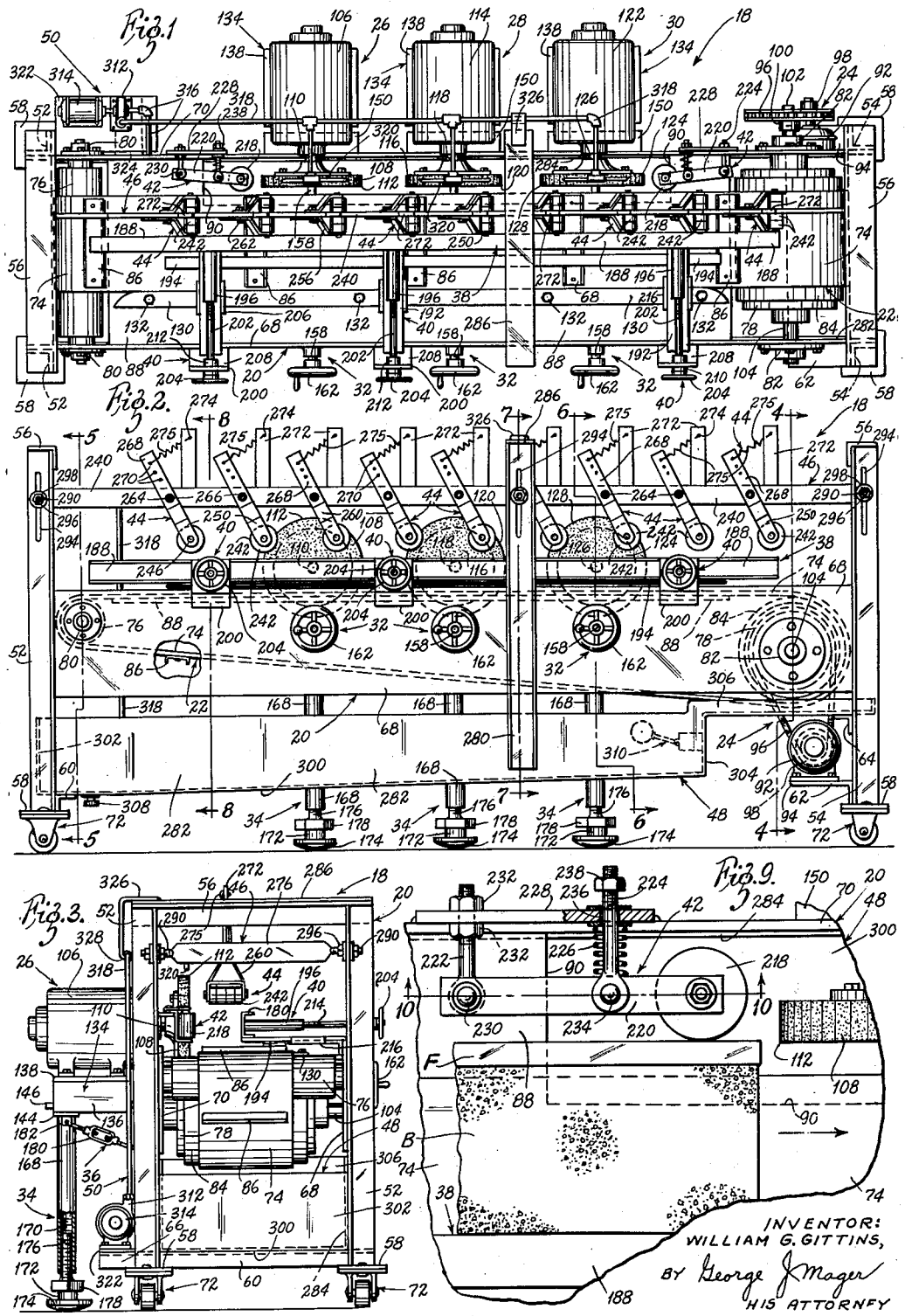
INVENTOR:
WILLIAM G. GITTINS,
BY George J Mager
HIS ATTORNEY

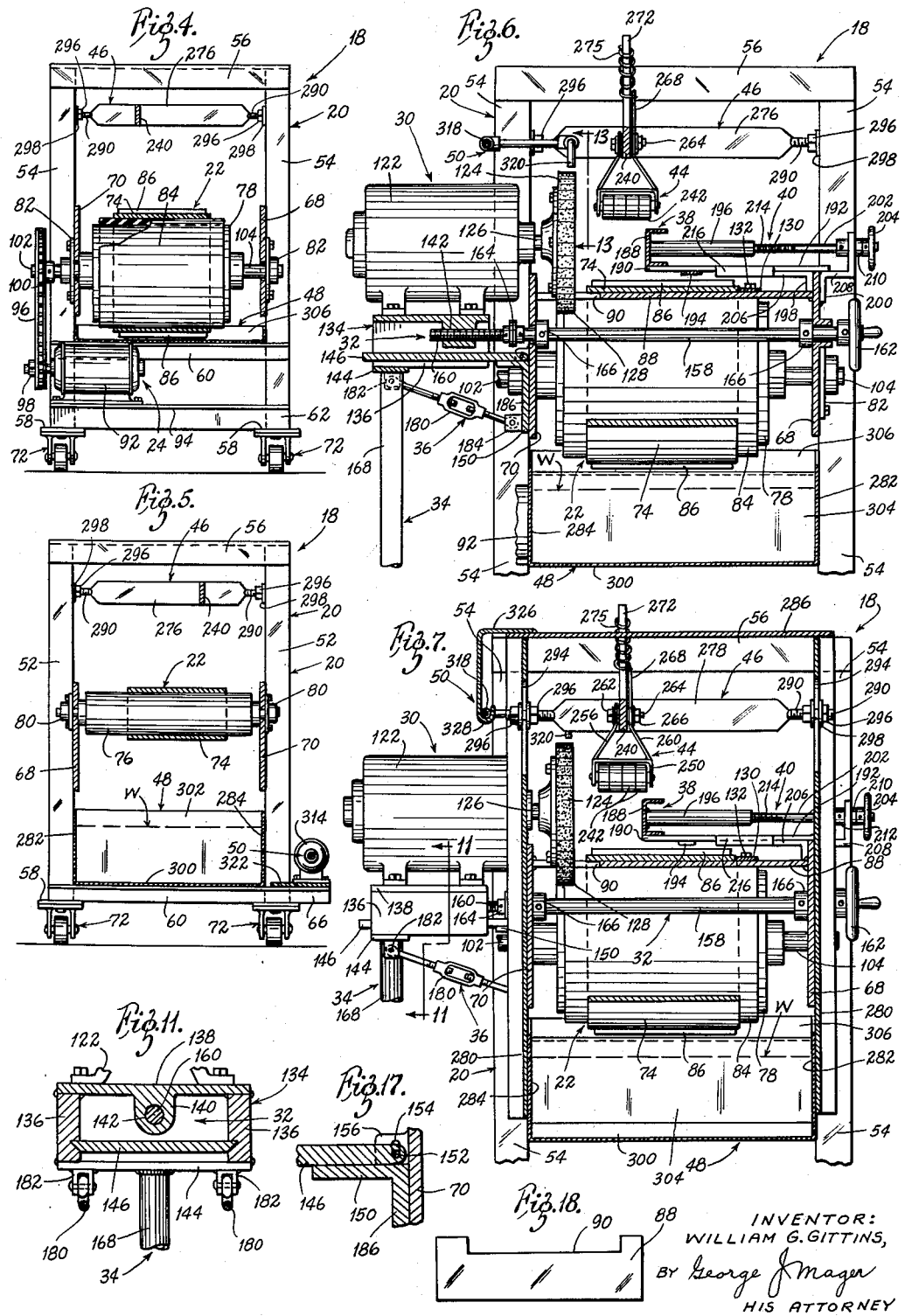

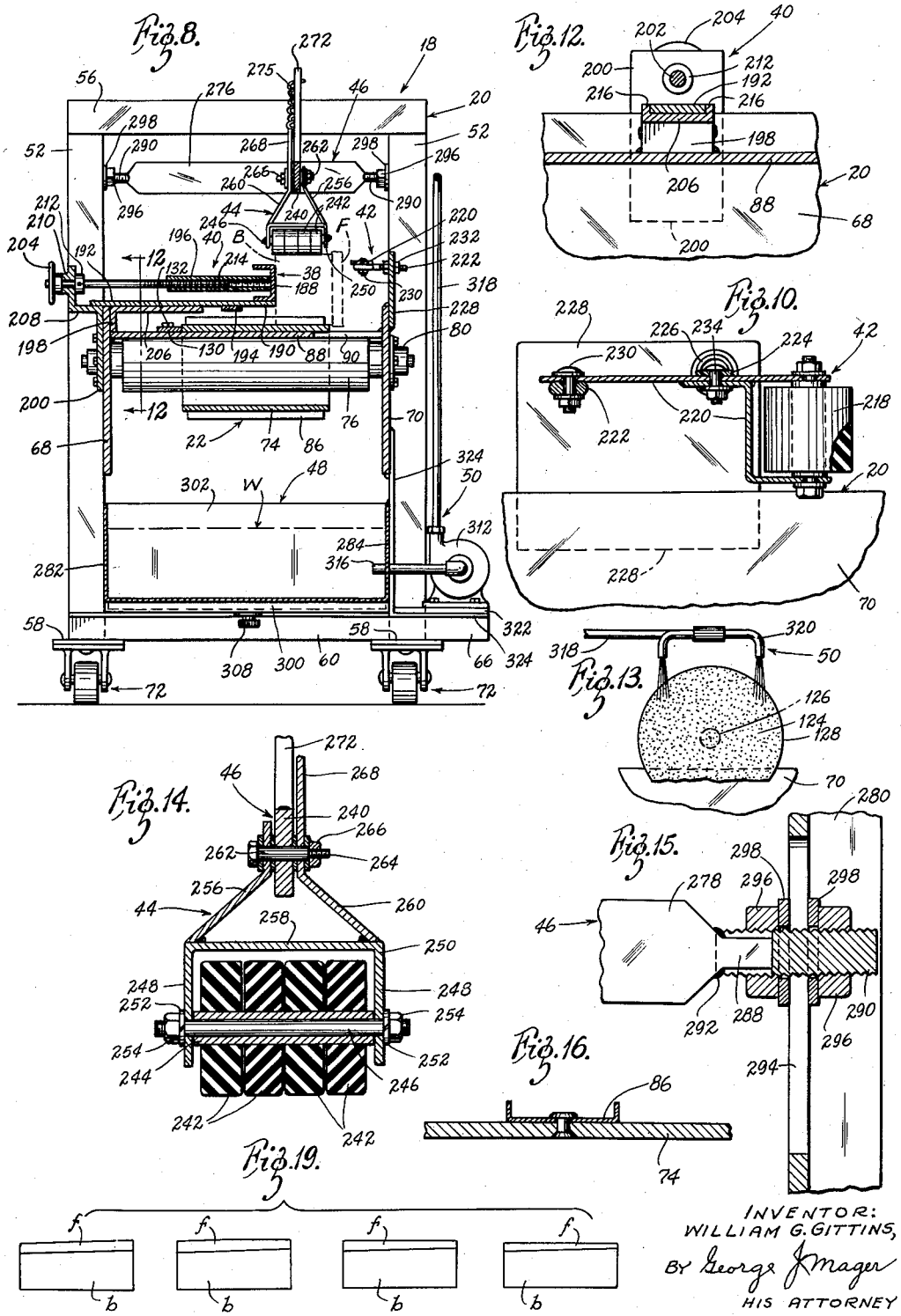

United States Patent Office 2,970,410
Patented Feb. 7, 1961

2,970,410

APPARATUS FOR USE IN MANUFACTURING PLASTIC FACED BUILDING UNITS

William G. Gittins, Ladue, Mo., assignor to Volz Aristocrat Plastics, Inc., St. Louis, Mo., a corporation of Missouri Filed Nov. 24, 1958, Ser. No. 775,906

8 Claims. (Cl. 51—110)

Generally, the present invention relates to the art of manufacturing blocks, panels, slabs and the like for use in building construction.

More particularly, this invention relates to a novel apparatus for use in the manufacture of prefabricated building units that are provided with a facing of plastic material bonded to a precast body of concrete or similar material.

In United States Patent No. 2,842,826 granted to me on July 15, 1958, there is disclosed an apparatus whereby a positive cohesion between a layer of plastic material and one face of a precast building unit is effected by means of regulated pressure thereto applied. Building units produced by the apparatus disclosed in said patent have proven highly satisfactory, particularly whenever the concrete bodies of said units had been accurately precast.

The building units under consideration, particularly the blocks, are usually processed in large quantities. That is to say, the apparatus disclosed in my said patent may be in continuous operation for days, thus producing a great number of plastic faced blocks that are subsequently cured, as is understood.

Heretofore, building units produced by the patented apparatus and thereafter cured have had the exposed surfaces of their plastic faces subjected to a succession of grinding and polishing operations whereby to enhance their appearance. Such operations have been accomplished by placement of the blocks, face upward, on a conveyor adapted to propel them successively beneath and in contact with a number of vertically disposed grinding and polishing wheels operatively mounted in a conventional well known type of machine designed for that purpose.

Such grinding operations have however, not been entirely satisfactory. The pressure required to grind the plastic faces frequently resulted in breakage of the therebelow concrete bodies of the blocks, inasmuch as these must absorb the pressure load, as should be clear. Furthermore, although the grinding of facings other than of plastic has generally been satisfactorily accomplished by employment of such vertical grinding means, it has been found that a superior finish is obtainable by cutting rather than grinding operations when the facings are of plastic material.

This cutting rather than grinding process has been found to be highly effective in consequence of continually lubricating the cutter discs with water as they revolve. In accordance with the concepts of this invention, the cutters are of stone, and are horizontally rather than vertically disposed. A constant spray of water is delivered to the cutting edges of the stones and descends therefrom into a reservoir, from which it is pumped for reuse. Sediment collects in the lowermost portion of the reservoir, and may be drained therefrom from time to time followed by replenishing of the reservoir with water.

Blocks subjected to the action of the lubricated and simultaneously thus cooled cutter discs are "pulled" rather than "driven" past said discs by means of an endless conveyor belt provided with longitudinally spaced transverse cleats as will appear.

The blocks are loaded onto the conveyor belt with their plastic facings overhanging the adjacent marginal edge of the belt, and are kept in alignment and against movements away from the cutters by means of a guide member that extends longitudinally of the apparatus. Lateral pressure is applied to the blocks entering and leaving the cutting zone by means of spring biased rubber roller assemblies, and downward pressure is applied to said blocks also by means of spring biased rubber roller assemblies, so that injury to the blocks, and particularly to the facings thereof, is prevented. At the same time however, the blocks are firmly controlled, so that the cutting operations are quickly and efficiently performed.

The primary object of the present invention therefore, is to provide an apparatus comprising a unitary assemblage of elements adapted to impart to plastic facings of building units a superior finish than has been obtainable by means of grinding machines heretofore employed for such purpose.

It is another object of the invention to provide, in the apparatus, means adapted to prevent injury of the block facings and to eliminate block breakage, or at least to reduce block breakage to a negligible minimum.

It is further an object of this invention to provide an apparatus that after having been "set up," will function to treat a great quantity of blocks efficiently and in continuous operation without requiring any attention other than the loading and removal of each block.

Broadly, the apparatus comprising this invention includes a structural framework that supports all of the various elements and mechanisms of the invention, and is itself preferably supported on caster assemblies. It will of course be understood that the caster assemblies are not essential to the operation thereof, but do serve to facilitate placement of the apparatus to best advantage with respect to piles of blocks that may have been cured at widely separated stations in a manufacturing plant.

In addition to the conveyor belt and its mechanism, the framework supports a motor and drive connections for activating said belt, and a transversely disposed plate along the top surface of which the upper stretch of said belt travels.

The lateral pressure application roller assemblies are adjustably mounted on portions of the framework, and the guide member is suspended above the conveyor belt by three longitudinally spaced mechanisms rigid with said framework. As will appear, the three mechanisms aforesaid also serve to dispose the guide member selectively toward or away from one marginal edge of the conveyor belt.

The downward pressure application roller assemblies are pivotally mounted on the longitudinal main bar of a frame that also includes a pair of transverse end bars, and an intermediate transverse bar, said frame being mounted in the framework for vertical adjustment toward and away from the conveyor belt.

The water reservoir referred to is substantially coextensive with the framework as viewed in plan, and is welded to all of the lower components thereof. The reservoir includes a splash pan extension that overlies the conveyor motor and protects it from spray water.

Three cutter assemblies are incorporated in the apparatus, each including a motor having a sharp cutting edged disc of stone attached to its shaft. The cutter assemblies are substantially supported from the framework, as are manually operable mechanisms individually associated therewith to vary the disposition of them relatively to the conveyor belt.

The overhanging or projecting portion of each cutter assembly is provided with an auxiliary support in the form of a tubular standard that may be adjusted to vary the disposition of each motor slightly from the horizontal, in the event the plastic facings of blocks produced in a certain run are not true. As will be more fully explained hereinafter, these auxiliary supports do not interfere with the mobility of the apparatus via the caster assemblies, provided the floor surface is fairly even.

Each of the cutter assemblies is also provided with finely adjustable stabilizing means, whereby to insure its smooth operation. The framework also supports the water spraying system of the apparatus, including a water pump and a motor for driving said pump.

In contemplation of the foregoing, it is a further object of the present invention to provide a unitary apparatus that may be transported from place to place along an even floor surface in a manufacturing plant without requiring removal of any of its components.

It is another object to provide an apparatus that may be adjusted for effective and efficient operation with respect to plastic faced blocks of various dimensions.

It is also an object of this invention to provide an apparatus that initially trues and thereupon finishes the plastic facings of imperfectly precast building units in one continuous operation.

Features and objects of the invention not specifically noted hereinabove, will be apparent or pointed out hereinbelow. A preferred embodiment of the invention is illustrated on three sheets of drawings that accompany this specification. It will of course be understood that these drawings are presented in an illustrative rather than in a limiting sense, and that structural details may be modified without departing from the basic principles of this invention.

In said drawings:

Figure 1 is a top plan view of an apparatus embodying the principles of the present invention;

Figure 2 is a front elevational view thereof;

Figure 3 is a left end elevational view of said apparatus;

Figure 4 is a vertical sectional view taken approximately on the line 4—4 of Figure 2, particularly illustrating the conveyor belt activating means;

Figure 5 is a vertical sectional view taken approximately on the line 5—5 of Figure 2;

Figure 6 is a slightly enlarged vertical sectional view taken on the line 6—6 of Figure 2 particularly illustrating a cutter assembly adjustment;

Figure 7 is a slightly enlarged vertical sectional view taken on the line 7—7 of Figure 2;

Figure 8 is a slightly enlarged vertical sectional view taken on the line 8—8 of Figure 2, particularly illustrating the guide means supporting and adjustment mechanism;

Figure 9 is a fragmentary plan view on an enlarged scale particularly illustrating one of the lateral pressure application roller assemblies;

Figure 10 is a vertical sectional view taken on the line 10—10 of Figure 9;

Figure 11 is a slightly enlarged vertical sectional view taken on the line 11—11 of Figure 7;

Figure 12 is an enlarged fragmentary sectional view taken on the line 12—12 of Figure 8;

Figure 13 is a fragmentary elevational view taken as indicated by the line 13—13 in Figure 6, particularly illustrating one of the water spraying devices associated with the cutter stones;

Figure 14 is an enlarged fragmentary sectional view of one of a plurality of downward pressure applying roller assemblies included in the apparatus;

Figure 15 is a reproduction on an enlarged scale and in vertical section of a portion of Figure 7;

Figure 16 is an enlarged fragmentary sectional view taken longitudinally through the conveyor belt, particularly illustrating the manner wherein transverse cleats are secured to said belt;

Figure 17 is a top plan view on a reduced scale of a conveyor belt supporting plate shown removed from the apparatus;

Figure 18 is an enlarged view in vertical section, of a fragmentary portion of a motor base supporting means; and Figure 19 is a schematic illustration of the appearance of an imperfect building block before, during, and after its subjection to the cutting action of the present apparatus.

In Figures 1 through 8, the apparatus comprising the present invention is designated generally by the numeral 18. Included in said apparatus and generally designated in the drawings are: a substantially rectangular framework 20; an endless conveyor belt mechanism 22 supported in said framework; conveyor belt activating means 24; a first cutter assembly 26; a second cutter assembly 28; a third cutter assembly 30; manually operable mechanisms 32, one associated with each of said cutter assemblies, whereby to vary the disposition of them relatively to the belt of the mechanism 22; cutter assembly supporting means 34, one associated with each of said assemblies 26, 28, and 30; finely adjustable means 36 complemental to the supporting means 34, whereby to properly stabilize each cutter assembly in a plane of most effective operation; building unit guide means 38; a plurality of manually operable guide means supporting and dispositioning mechanisms 40; a pair of roller assemblies 42 that apply lateral pressure against building units entering and leaving the cutting zone of the apparatus; a plurality of roller assemblies 44 that apply downward pressure against building units being subjected to the cutting action of the apparatus; a vertically variable structure 46 whereupon the roller assemblies 44 are mounted; a water reservoir 48; a water pumping and spraying system 50; and various stationary and movable elements associated with the foregoing, as will appear.

The framework 20 includes a pair of transversely spaced uprights 52 at the left, or what will be called the loading end of the apparatus 18, and a similar pair of uprights 54 at the right, or what will be called the delivery end of the apparatus. As shown in the drawings, these uprights are angle bars, and are connected by transverse angle bars 56 at the top, and each of them rests on and is rigidly secured to a baseplate 58 at the bottom. At the loading end, the uprights 52 are connected adjacent the baseplates 58 by a transverse angle bar 60, and at the delivery end, the uprights 54 are similarly connected by a transverse angle bar 62. The delivery end uprights 54 are furthermore connected by a transverse angle bar 64, and the rear end portion 66 of the loading end bar 60 extends beyond the framework 18, for reasons to appear. The framework of the apparatus further includes a front plate 68 that extends longitudinally to connect the front uprights 52 and 54, and a rear plate 70 that likewise extends longitudinally to connect the rear uprights 52 and 54.

It will be understood that all of the structural members thus far enumerated are rigidly secured together by appropriately applied welding, so that the framework 20 constitutes a sturdy unitary structure that is additionally rigidified by various other elements to be described below. Preferably as shown, but not necessarily, said framework 20 is supported on sturdy caster assemblies 74.

The mechanism 22 includes an endless conveyor belt 74 trained over an idler roller 76 at the loading end of the apparatus, and over a driven roller 78 at the delivery end thereof. The idler roller 76 is rotatably supported in suitable bearings 80 that are affixed to the front and rear plates 68 and 70 respectively, as best seen in Figure 5. The driven roller 78 is also rotatably supported in suitable bearings 82 that are affixed to the front and rear plates 68 and 70 respectively, as best seen in Figure 4. Preferably, as also shown in Figure 4, the driven roller 78 has a rubber covering 84, thus insuring a positive drive or "pull" of the upper stretch of belt 74 in a rightward direction (as viewed in Figures 1, 2, and 9).

Although not illustrated in the drawings inasmuch as such devices are old and well known, it will be understood that one or more belt tightener devices would be appropriately incorporated in the instant apparatus.

With attention directed especially to Figure 16, longitudinally spaced transversely extending channel shaped cleats 86 are secured to the conveyor belt 74 in the manner illustrated, or otherwise. In actual practice, these cleats are spaced approximately sixteen inches apart, so that modular building units of any standard size may be processed by loading them onto the belt between adjacent cleats.

A horizontally disposed plate designated 88 and shown per se in Figure 18, has its transversely opposite edges welded to the front and rear side plates 68 and 70 respectively, and supports the upper stretch of the conveyor belt from a point slightly removed from the idler roller 76, to a point slightly removed from the driven roller 78. The conveyor supporting plate 88 has a cutout or recess 90 formed in the rearward portion thereof, as shown. It is to be observed at this point that the plate 88, in addition to supporting the upper stretch of the belt 74, also serves to rigidify the framework 20 intermediate the upper and lower structural members thereof.

The means 24 for activating the conveyor belt mechanism includes a motor 92 mounted on the horizontal leg portion 94 of the angle bar 62, and a drive chain 96 that is trained over a small motor sprocket 98 and over a comparatively large sprocket 100 affixed to a rearwardly projecting end portion 102 of the driven roller shaft 104.

The first cutter assembly 26 includes a motor 106 having a cutter stone 108 affixed to its shaft 110. The stone 108 is in the form of a disc, is of comparatively coarse composition, and is provided with a sharp circular cutting edge 112.

The second cutter assembly 28 includes a motor 114 having a cutter stone 116 affixed to its shaft 118. The stone 116 is also in the form of a disc, is of comparatively fine composition, and is provided with a sharp circular cutting edge 120.

The third cutter assembly 30 includes a motor 122 having a cutter stone 124 affixed to its shaft 126. The stone 124 is likewise in the form of a disc, is of extremely fine composition, and is provided with a sharp circular cutting edge 128.

Each of the three motors is mounted for individual adjustment transversely of the apparatus, whereby the cutting edge of each cutter stone disc may be brought toward and away from the rear marginal edge of the conveyor belt 74. It is of course important that the said rear marginal edge of the belt be maintained at least approximately constant, wherefore a guide plate 130 is disposed against the front marginal edge thereof, as best seen in Figure 1. The guide plate 130 is secured to the plate 88 by machine screws 132 that also appear for example in Figures 6 and 7. As also best seen in the views referred to, the recess 90 is provided in the conveyor supporting plate 88 to accommodate the lower portions of the cutter discs, to permit the transverse adjustments of them, and for an additional reason to be clarified below.

The manually operable mechanism 32 associated with each assembly motor includes a hollow motor base shown to best advantage in Figures 6, 7, and 11, where it is generally designated by the numeral 134. The base 134 is comprised of a pair of spaced side rails 136 rigidly connected by a top plate 138 whereto the motor supporting legs are bolted as shown, or otherwise secured. The plate 138 has a depending boss 140 centrally thereof, said boss having an internal thread formation designated 142. At the rear ends thereof, the side rails 136 are rigidly connected by a bottom plate 144.

As will appear, each of the three bases 134 and the motor mounted thereon is provided with three supporting means. Thus, each hollow motor base 134 is slidably supported on a relatively heavy plate 146 that has its marginal edges dovetailed into the side rails 136, as shown in Figure 11. The forward extremity of said plate is rounded, and rests on the horizontal leg of an angle bar 150 rigid with the rear side plate 70. A pin 152 extends through said extremity and projects through slightly elongated slots 154 provided therefor in a pair of longitudinally spaced lugs 156 rigid with said rear plate and angle bar, as should be clear from an inspection of Figure 17. It will of course be understood that all adjustments of the cutter assemblies 26, 28, and 30 are slight, whether transverse or angular, as will be more fully explained.

Each mechanism 32 also includes a transverse operating shaft comprised of a rotatably supported front section 158, and a threaded rear section 160 that engages in the motor base boss 140.

The forwardly projecting end of the shaft section 158 has a handwheel 162 affixed thereto, and said front and rear sections are united by a suitable universal connection 164. Collars 166 are affixed to the front shaft section 158 in contact with the inner faces of the framework plates 68 and 70 as shown.

With this arrangement, it should be evident that any rotation of the handwheels 162 will vary the disposition of the cutter discs relatively to the rear marginal edge of the belt conveyor, and that such adjustments may be easily made.

Each of the cutter assemblies 26, 28, and 30 is further individually supported in the appropriate position thereof by the means 34. Each cutter assembly supporting means 34 includes a tubular standard 168 that is rigidly secured at its upper end to the bottom plate 144 of the hollow motor base 134.

As illustrated particularly in Figure 3, the lower end portion of the standard 168 is internally threaded as indicated at 170. Numeral 172 designates a foot member having a rounded sole portion 174 and an externally threaded leg member 176 in engagement with the internally threaded lower end portion 170 of the standard 168. A polygonal formation 178 is provided intermediate the leg and foot members for the application of a suitable tool whereby to rotate these members, so as to vary the disposition of any of the cutter assembly stone discs from the perpendicular when desirable.

In addition to the foregoingly described cutter assembly supporting and adjusting means, motor stabilizing means 36 for each of said assemblies are provided. In other words, the present invention provides every safeguard against malfunctioning of the apparatus 18, so that building units produced by the apparatus disclosed in my said Patent No. 2,842,826 may not be damaged or their utility impaired in consequence of the subjection thereof to the action of the instant apparatus.

To this end, each motor stabilizing means includes a pair of finely adjustable turnbuckles 180. As most clearly shown in Figures 6, 7, and 11, the rearward extremity of each turnbuckle has a pivotal connection with a bracket 182 dependingly and rigidly secured to the bottom plate 144 of the motor base 134, and the forward extremity of each turnbuckle has a pivotal connection with a bracket 184 rigid with the vertical leg 186 of the angle bar 150.

Inasmuch as building units conveyed past the cutter discs must be restrained from movements away therefrom, the present invention provides the aforesaid guide means 38, and the mechanisms 40 for supporting said guide means in the appropriate disposition relatively to said discs.

Included in the means 38 is a channel-shaped guide member 188 that extends, as shown particularly in Figures 1 and 2, longitudinally of the apparatus from above the idler roller 76 to above the driven roller 78. The guide 188 rests on and is rigidly secured to the rear end portions 190 of three spaced bars 192, and the bars 192 are rigidly secured to a connecting bar 194, as shown. Three internally threaded sleeves 196 are welded to the guide member and project forwardly therefrom, each of said sleeves being in alignment with one of the bars 192.

Each of the mechanisms 40 includes a horizontal rearwardly projecting angle plate 198, a vertical forwardly offset angle plate 200, a shaft 202, and a handwheel 204 secured to the forward end portion of said shaft. As seen to best advantage in Figure 8, the top surface of the horizontal leg 206 of the plate 198, the top surface of the web portion 208 of the plate 200, and the top edge of the front plate 68 are planarly disposed and slidably support the bar 192. The shaft 202 is rotatably mounted at its forward end in a bearing 210 provided therefor in the plate 200, and is restrained against endwise movement by a collar 212. The opposite end 214 of the shaft 202 is in threaded engagement with the sleeve 196. As seen to best advantage in Figure 12, the horizontal leg portion 206 of the angle plate 198 is provided with upstanding marginal flanges 216 that serve as guides for the plate 192.

As illustrated in Figure 1, one of the lateral pressure application roller assemblies 42 is mounted adjacent the left or loading end of the apparatus, and the other is mounted adjacent the right or delivery end. The loading end assembly 42 is most clearly illustrated in Figures 9 and 10, it being understood that the delivery end assembly is similar, and similar reference numerals have been applied in the drawings to corresponding elements.

Each assembly 42 includes a rubber roller 218, a supporting frame 220 for the roller, a first eye bolt 222, a second eye bolt 224, a compression spring 226, and other elements associated with these major components. The entire assembly is supported from a rectangular plate 228 that is rigidly secured to the rear frame plate 70 and projects thereabove as shown. The eye bolt 222 constitutes the primary support for the frame 220 which has a pivotal connection 230 therewith. The eye bolt 222 is maintained in place by a pair of nuts 232. The eye bolt 224 constitutes a secondary support for the frame 220 which has a pivotal connection 234 therewith, said eye bolt extending freely through a circular opening 236 provided therefor in the plate 228. The compression spring 226, interposed about the bolt 224 between the frame 220 and the plate 228, constantly biases the roller 218 toward the guide member 188. A nut 238 applied to the threaded end of the eye bolt, controls and limits the action of the compression spring 226, as should be apparent.

Each of the roller assemblies 44 is of identical construction, and each of them is pivotally mounted on the main bar 240 of the vertically adjustable structure 46.

With attention focused for the present on Figure 14, it will be observed that an assembly 44 includes a plurality of rubber rollers 242 rotatably mounted on a bearing sleeve 244 that is in turn rotatably mounted on a shaft 246. The ends of the shaft 246 are supported in the spaced leg segments 248 of a channel shaped bracket 250, said shaft being retained by lock washers 252 and nuts 254 as shown, or otherwise. Numeral 256 designates a first angular supporting arm for the bracket 250, the lower end of said arm being rigidly attached to the web portion 258 of said bracket. Numeral 260 designates a second angular supporting arm for the bracket 250, the lower end of said arm being likewise rigidly attached to the web portion 258. Extending through aligned circular openings in the arm 256, the main bar 240, and the arm 260, is a headed pivot pin 262 that terminates in a reduced threaded extremity 264 having a retaining nut 266 applied thereto. The arm 260 has an upward extension 268 wherein, as shown in Figure 2, spaced apertures 270 are formed, successive apertures being farther removed from the pivot pin 262.

Rigidly secured at their lower ends to the main bar 240 and projecting upwardly therefrom, are longitudinally spaced bars 272 each having an aperture 274 formed therein adjacent its upper end. A bar 272 is provided for each roller assembly 44, and a tension spring 275 has its lower end releasably anchored in one of the apertures 270 of the arm 268, with its upper end anchored in the bar aperture 274.

In addition to the main bar 240, the assembly 46 includes end crossbars 276, and an intermediate crossbar 278, all of said bars being integrated by welding to comprise a unitary support for the pressure roller assemblies 44.

Means are provided for raising and lowering said support to a plane appropriate for building units of various dimensions. To this end first of all, the invention provides a pair of vertically disposed channel members 280 intermediate the uprights 52 and 54. One of said members is rigidly secured to the front plate 68 and to the front wall 282 of the reservoir 48. The other of said members 280 is rigidly secured to the rear plate 70 and to the rear wall 284 of said reservoir. Surmounting the channel members 280 and having its ends rigidly secured to the upper ends thereof, is a crossbar 286, as best seen in Figure 7. At this point, it should be apparent that the channel members 280 in conjunction with the crossbar 286 serve to reinforce the middle part of the framework 20.

The end crossbars 276 and the intermediate crossbar 278 terminate in reduced segments 288 that extend into slots provided therefor in threaded studs 290, the studs being welded to the bars as suggested at 292 in Figure 15. Each of the uprights 52, 54, and the channel members 280 have similar elongated vertical slots 294 formed therein through which the studs 290 extend. A pair of nuts 296 each bearing against a washer 298 serve to maintain the crossbars 276 and 278 together with the main bar 240 in any selected planar disposition permissible between the upper and lower ends of the slots 294, as should be apparent in view of Figure 15.

In addition to the front and rear walls 282 and 284 respectively, the reservoir 48 includes a sloping bottom wall 300, a left end wall 302, a right end wall 304, and a splash pan extension 306 that rests on and is rigidly secured to the transverse angle bar 64. The extension 306 serves to protect the motor 92 from any water that may splash in its direction.

The left end portion of the reservoir 48 rests on and is rigidly secured to the transverse angle member 60, and constitutes a sump toward which the heavier particles of plastic material sheared from the building unit facings gravitate, and wherein these particles gradually collect as is understood. Discharge of such sediment from time to time may be had via the exemplary normally capped drain 308 appearing in Figures 2 and 8. The normal water level is indicated at W in Figures 5 and 8, and a float device 310 shown in broken lines only in Figure 2 may serve as a guide for replenishing the reservoir 48 with water following a sump drainage operation.

The water spray system 50 includes a suitable pump 312 driven by a motor 314, a supply pipe 316 leading from the reservoir to the intake side of the pump as best seen in Figure 8, a header pipe 318 leading from the discharge side of said pump, and as best shown in Figures 1 and 13, a dual spray nozzle 320 for each of the cutter discs 108, 116, and 124. The pump 312 and motor 314 are mounted on a base plate 322. The left end portion of said base plate rests on and is rigidly secured to the rear end portion 66 of the angle bar 60, and said plate is furthermore supported by an angular bracket 324 that is welded to the rear plate 70 and the rear wall 284 of the reservoir 48. The pipe 318 is appropriately supported by means of a bracket 326 welded to the crossbar 286. As best seen in Figure 7, the bracket 326 is angular, and includes a depending portion terminating in a reversely formed arcuate segment 328 wherein the pipe 318 is disposed.

Prior to entering into a detailed description of the operation, it may be well to present a few general observations. Thus, although not illustrated in the drawings, it is to be understood that a suitable control panel is associated with the apparatus, said panel being provided with individual start and stop switch buttons for controlling the motors 92, 106, 114, 122, and 314.

It is furthermore to be understood, that the various described adjustments are made in the apparatus by the employment of one or two trial units of a great quantity of building units previously produced by the apparatus disclosed in my said Patent No. 2,842,826, so that once the present apparatus 18 has been properly "set up," all of the remaining building units may be expeditiously processed thereby without requiring further adjustments of the various mechanisms and pressure applying assemblies.

It is also to be understood that the terms "rigidly secured" and "rigid with" frequently employed herein, signify that the parts referred to are welded together. In some of the enlarged views such as Figures 9 and 14 for example, the weldings have been illustrated, and in Figure 15, the welding has been both illustrated and identified by a reference numeral (292).

Building units produced by the apparatus of my said patent will have a plastic facing thickness of approximately one quarter of an inch, so that the cutter discs of the instant apparatus would be adjusted in such manner that neither of them could shear off more than one thirty-second of an inch from such facing.

The adjustments provided for in consequence of the supporting means 34, and the thereto complemental motor stabilizing means 36, are in the fine adjustment category, inasmuch as it is seldom necessary in practice to vary the disposition of the cutter discs more than a few degrees from the perpendicular.

The channel guide 188 admits of a wide range of adjustment, so that building units of various sizes may be loaded onto the upper stretch of the conveyor belt 74 between the cleats 86, to be advanced by these cleats toward and past the stone cutter discs 108, 116, and 124. The lateral pressure application assemblies 42 have dual adjustments, either or both of them serving to appropriately regulate the pressure applied by the roller 218 to each of a batch of blocks as they enter and leave the cutting zone.

The unitary frame 46 that is comprised of the main bar 240 together with the transverse bars 276 and 278, may be raised or lowered to a position wherein the proper downward pressure would be applied by the rollers 242 to each of a batch of blocks passing through the cutting zone.

*Operation*

Although it is believed that the mode of operation should be apparent from the foregoing description and observations augmented by an inspection of the drawings, an additional brief explanation will be given.

It will be assumed that random blocks of a run of blocks produced by the apparatus disclosed in Patent No. 2,842,826 and thereafter cured, have been measured and found to be true, and that it is thereupon desired to impart a high polish finish to the plastic faces thereof. Employing one or two of the blocks for trial purposes, the apparatus would be "set up" by means of the various adjustments illustrated and described. Thus, with particular attention directed to Figure 8, the guide member 188 would be moved by rotation of the three handwheels 204 to a position wherein it would contact one face of the block with the plastic face thereof overhanging the rear marginal edge of the belt 74, as suggested in broken lines. Ordinarily, except when relatively narrow units such as slabs for example are to be processed, it would not be necessary to adjust the lateral pressure application assemblies 42. However, should adjustments be required to insure against blocks moving away from the guide member, these would be made. The bar structure 46 would be raised or lowered as the case may be, to insure that adequate downward pressure will be directed against blocks, and said frame would then be locked in such position by means of the six washer and nut arrangements that are similar to that illustrated on a large scale in Figure 15.

An exemplary block is shown in broken lines in Figure 8, and in full lines in Figure 9, where the prefabricated concrete body of the block is designated B, and the plastic face portion thereof is designated F. The handwheel 162 of the mechanism 32 associated with the first cutter assembly 26 would first be rotated to bring the cutting edge 112 of the disc 108 into a position adapted to shear not less than one sixty-fourth nor more than one thirty-second of an inch off the plastic face F.

Thereupon the handwheel 162 of the mechanism 32 associated with the second cutter assembly 28 would be rotated to bring the cutting edge 120 of the disc 116 into a position adapted to shear not more than an additional one thirty-second of an inch off said face.

Finally, the handwheel 162 of the mechanism 32 associated with the third cutter assembly 30 would be rotated to bring the cutting edge 128 of the disc 124 into a position adapted to shear not more than an additional one thirty-second of an inch off the facing F. The cutting zone hereinbefore referred to, begins at the extreme left peripheral portion of the cutter 108, and terminates at the extreme right peripheral portion of the cutter 124, so that no lateral pressure application devices are requisite in the cutting zone area to maintain the blocks against the guide member 188.

With the cutter assemblies properly disposed, each foot member 172 may be rotated via the polygonal segment 178 so that the rounded sole 174 of the foot 172 would contact the floor. Thereupon, the turnbuckles 180 would be drawn taut, and assuming the reservoir is properly filled with water, the apparatus would be in condition to begin operations.

After the five motors 92, 106, 114, 122, and 314 had been energized, any number of blocks corresponding to the block B could successively be loaded onto the conveyor belt 74. Manifestly, each block is positioned between an adjacent pair of cleats 86, and each block is pulled by said cleats past the cutters, it having been found by numerous tests, that such pulling of the blocks B provides for more efficient operation.

In Figure 9, the block B there illustrated is entering the cutting zone, and about to be contacted by the cutting edge 112 of the disc 108. As earlier noted, the cutter 108 would shear off not more than one thirty-second of an inch, and as the block advances rightwardly, the cutters 114 and 122 would do likewise.

With particular reference to Figures 6 and 13, the cutters are continuously lubricated and thus cooled by water pumped from the reservoir 48 via the pipe 316 and delivered to the cutters via the dual nozzle members 320. The water pump 312 operates continuously inasmuch as the cutters revolve at high speed, and the nozzles 320 are designed to provide for a constant and unrestricted flow of the water onto the cutters. From the cutters, the water and sheared-off plastic material drop into the reservoir 48 via the recess 90 of the transverse plate 88.

The appearance of an imperfect building block, before and after being passed through the apparatus 18 is schematically illustrated in Figure 19, the defects being exaggerated in the interest of clarity as is understood. The concrete body of the exemplary block is designated $b$, and the plastic facing thereof is designated $f$.

Assuming for example, that the prefabrication of the body $b$ resulted in an imperfect block, and therefore the subsequently thereto bonded plastic face $f$ did not parallel the opposite face of said block, the resulting appearance is suggested in the first (viewed from left to right) illustration thereof. The resulting appearance of said block, after it has passed the first cutter 108, is suggested in the second illustration thereof. The resulting appearance of the block, after it has passed the second cutter 116, is suggested in the third illustration thereof. The final appearance of the block, after it has passed the third cutter 124, is suggested in the fourth illustration thereof.

With respect to said fourth illustration, it will be observed that the opposite faces of the block are parallel. The plastic facing $f$ obviously is no longer of uniform thickness, but this is of no importance inasmuch as this slight difference could not be discernible in an actual block. Furthermore, in an erected wall, the facing thicknesses are not visible.

In view of the foregoing description augmented by the comprehensive drawings, it is believed that an adequate disclosure of the present invention has been given. Although a preferred embodiment thereof has been illustrated and described, it will be understood that my invention is not limited to the precise structural details disclosed, but contemplates any and all modifications and equivalents that may fall within the purview of the appended claims.

What I claim is:

1. In an apparatus for finishing the plastic facings of concrete building units by shearing therefrom determined successive layers of material, the combination of: a substantially rectangular framework; an endless conveyor belt mechanism and means for activating the belt thereof supported in said framework, said belt being adapted to have said building units loaded onto the upper stretch thereof with the plastic facing of each unit overhanging one marginal edge of the belt; three longitudinally spaced cutter assemblies each individually supported from said framework; a motor driven cutter disc included in each assembly, each said disc being of stone composition and provided with a sharp circular cutting edge, the stone of the first disc being of comparatively coarse composition, the stone of the second disc being of comparatively fine composition, the stone of the third disc being of extremely fine composition; a manually operable mechanism associated with each cutter assembly whereby to vary the disposition of the disc relatively to the conveyor belt; finely adjustable means for stabilizing each cutter assembly in a determined plane of operation; guide means extending longitudinally thereof suspended above the conveyor belt and adapted to maintain building units on said belt in alignment; a plurality of manually operable mechanisms whereby to maintain said guide means in a selected disposition relatively to the cutter assemblies; a pair of roller assemblies for applying lateral pressure to building units on the conveyor belt as they enter and leave the cutting zone defined by the three longitudinally spaced cutter assemblies aforesaid; a plurality of roller assemblies for applying downward pressure to said units; a water reservoir rigid with said framework; and a water pumping and spraying system supported on the framework for continuously lubricating the discs of said cutter assemblies.

2. In apparatus for finishing the plastic facings of concrete building units by shearing therefrom determined successive layers of material, the combination of structure set forth in claim 1 wherein the framework is mounted on caster assemblies, wherein said endless conveyor belt is trained over an idler roller at the loading end and over a driven roller at the delivery end of said apparatus, and wherein said conveyor mechanism further includes bearings affixed to said framework rotatably supporting said rollers; a covering of rubber for the driven roller; a horizontally disposed plate rigid with the framework supporting the upper stretch of the conveyor belt between the idler and the driven roller; a stationary guide secured to said plate and disposed against one marginal edge of the upper stretch of said belt; and longitudinally spaced transversely extending cleats secured to said belt and adapted to pull building units thereon past the cutter assemblies.

3. In apparatus for finishing the plastic facings of concrete building units by shearing therefrom determined successive layers of material, the combination of structure set forth in claim 1, wherein each manually operable mechanism for varying the disposition of a cutter assembly relatively to the conveyor belt includes: a hollow base for the motor of the assembly, said base being slidably supported on a heavy plate having its marginal edges dovetailed into the side rails of the base; an internally threaded boss rigid with said base; a transverse operating shaft comprised of a rotatably supported section and a threaded section in engagement with said boss; a universal connection between said sections; collar means preventing endwise movements of said shaft; and a handwheel affixed to the end of the rotatably supported section opposite the universal connection aforesaid for imparting rotary movements to said shaft.

4. In apparatus for finishing the plastic facings of concrete building units by shearing therefrom determined successive layers of material, the combination of structure set forth in claim 1, wherein the finely adjustable means for stabilizing each cutter assembly in a determined plane of operation includes: a hollow base for the motor of the assembly; a first pair of spaced depending brackets rigidly secured to said base; a second pair of correspondingly spaced brackets rigidly secured to said framework; a pair of turnbuckles each having a pivotal connection with one of said first and one of said second pair of brackets; a tubular standard rigidly connected at its upper end to said base and having its lower end internally threaded; a foot member having a rounded sole portion for engagement with the surface whereon said apparatus rests; an upwardly extending externally threaded leg member in engagement with said lower end of the standard; and a polygonal formation thereon for the application of a suitable tool whereby to rotate the foot member.

5. In apparatus for finishing the plastic facings of concrete building units by shearing therefrom determined successive layers of material, the combination of structure set forth in claim 1, wherein the guide means for building units deposited onto the conveyor belt includes: a channel-shaped guide member that extends longitudinally of the apparatus from a point above the idler roller to a point above the driven roller of said conveyor mechanism; a plurality of spaced bar members suspending said guide member above the conveyor belt, said bar members being in turn each slidably supported on the horizontal leg of an angle plate rigid with said framework; a longitudinally extending bar rigid with and connecting said bar members; a plurality of internally threaded sleeves each rigid at one end with the guide member and projecting therefrom in a plane above but in vertical alignment with one of said bar members; a plurality of shafts each rotatably mounted at one end in a bearing provided therefor on an offset angle plate rigid with the framework, and having its opposite end in threaded engagement with one of said sleeves; collars for restraining said shafts against endwise movements; and handwheels secured to each of said shafts for imparting rotary movements thereto.

6. In appartaus for finishing the plastic facings of concrete building units by shearing therefrom determined successive layers of material, the combination of structure set forth in claim 1, wherein each of the pair of lateral pressure application assemblies includes: a mounting plate rigid with the framework; a rubber roller; a supporting frame for the roller; a first eye bolt constituting the primary support for said frame, said eye bolt being secured at one end to the mounting plate and projecting laterally therefrom; a pivotal connection between the free eye end of said bolt and said frame; a second eye bolt constituting a secondary support for said frame, one end of said second eye bolt extending freely through a circular opening in the mounting plate and having a nut applied to its threaded extremity; a pivotal connection between the eye end of the second bolt and said roller supporting frame; and a compression spring interposed about the second bolt between the eye end thereof and the mounting plate for constantly biasing said roller in a direction away from said mounting plate.

7. In apparatus for finishing the plastic facings of concrete building units by shearing therefrom determined successive layers of material, the combination of structure set forth in claim 1, wherein each of the plurality of downward pressure application assemblies is supported from the main bar of a vertically adjustable structure mounted in said framework and includes: a plurality of rubber rollers rotatably mounted on a bearing sleeve that is in turn rotatably mounted on a shaft having its ends mounted in the leg segments of a channel shaped bracket member; a first angular supporting arm for the bracket, the lower end of said arm being rigidly secured to the web portion of said bracket; a second angular supporting arm for the bracket, the lower end of said arm also being rigidly secured to the web portion of said bracket; a pivot pin extending through aligned circular openings in said arms and said main bar; an upward extension integral with said second supporting arm having a series of spaced apertures formed therein; and a tension spring having its lower end anchored in one of said apertures and its upper end anchored in an aperture provided therefor in an upwardly projecting bar rigidly secured at the bottom to the main bar aforesaid of said vertically adjustable structure, said spring constantly biasing the rollers aforesaid in a downward direction.

8. In apparatus for use in the manufacture of a plastic faced concrete building unit, means for finishing said plastic face by shearing therefrom three successive layers of material each having a width not exceeding one thirty-second of an inch, said means comprising in combination: spaced first, second, and third motor driven stone cutter discs, said first disc being of comparatively coarse composition, said second disc being of comparatively fine composition, said third disc being of extremely fine composition, and all of said discs having a sharp circular cutting edge; a conveyor belt provided with spaced transverse cleats for propelling said unit past the cutter discs; a manually operable mechanism associated with each cutter disc for controlling the disposition thereof relatively to said conveyor belt; a supporting plate for the upper stretch of said belt; guide means suspended above the conveyor belt for engaging the face of the unit opposite the plastic face thereof as the unit is propelled past the cutter discs; lateral pressure application roller assemblies biasing the unit toward the guide means as it enters and leaves the cutting zone that extends from said first to said third cutter disc; downward pressure application roller assemblies engaging the top surface of the unit as it enters, passes through, and leaves said cutting zone; and means for continuously spraying each cutter disc with water during shearing operations.

References Cited in the file of this patent

UNITED STATES PATENTS

| 2,538,532 | Oliver | Jan. 16, 1951 |
| 2,732,590 | Clercq | Jan. 31, 1956 |
| 2,842,826 | Gittins | July 15, 1958 |